(12) United States Patent
Lemaire

(10) Patent No.: US 12,202,217 B2
(45) Date of Patent: Jan. 21, 2025

(54) METHOD FOR REPAIRING A LEAK AT THE BOTTOM OF A CONTAINER COMPRISING A REVERSIBLE SEALING OF THE LEAK

(71) Applicant: BOUYGUES ENERGIES & SERVICES, Guyancourt (FR)

(72) Inventor: Olivier Lemaire, Antony (FR)

( * ) Notice: Subject to any disclaimer, the term of this patent is extended or adjusted under 35 U.S.C. 154(b) by 114 days.

(21) Appl. No.: 18/028,620

(22) PCT Filed: Sep. 30, 2021

(86) PCT No.: PCT/FR2021/051693
§ 371 (c)(1),
(2) Date: Mar. 27, 2023

(87) PCT Pub. No.: WO2022/069840
PCT Pub. Date: Apr. 7, 2022

(65) Prior Publication Data
US 2023/0356486 A1 Nov. 9, 2023

(30) Foreign Application Priority Data
Oct. 2, 2020 (FR) ..................... 2010089

(51) Int. Cl.
*B29C 73/02* (2006.01)
*B29C 73/16* (2006.01)
(52) U.S. Cl.
CPC .............. *B29C 73/02* (2013.01); *B29C 73/16* (2013.01); *B29K 2995/0098* (2013.01)

(58) Field of Classification Search
CPC .... C09K 3/12; Y10T 156/1168; F16L 55/164; B29C 73/02; B29C 73/04; B29C 73/10; B29C 73/16; B29C 73/166
USPC ......... 156/94, 98, 714; 220/561; 138/97, 98, 138/99; 277/316
See application file for complete search history.

(56) References Cited

U.S. PATENT DOCUMENTS

| 4,114,552 A * | 9/1978 | Ross | B63B 43/16 114/227 |
|---|---|---|---|
| 2011/0024988 A1* | 2/2011 | Ryan | C09K 8/508 277/316 |
| 2012/0067447 A1* | 3/2012 | Ryan | F16L 55/1645 524/544 |
| 2020/0199967 A1* | 6/2020 | Quinn | F16L 55/1612 |

* cited by examiner

*Primary Examiner* — John L Goff, II
(74) *Attorney, Agent, or Firm* — Harness, Dickey & Pierce PLC

(57) ABSTRACT

A method for repairing a leak caused by a hole (3) at the bottom of a container (1) with liquid contents (2), comprising a reversible sealing of the leak in which: —a sealing mixture (5) is poured into the liquid contents in the vicinity of the hole, the sealing mixture (5) comprising a sealing product (7) and solid fillers (8) mixed into the sealing product (7), the sealing product (7) having a density greater than those of the liquid contents and the fillers, and the capability to solidify within the liquid contents (2), —the sealing mixture (5) spreads over the bottom (4) of the container (1) and reaches the hole (3), —fillers (8) filling the hole (3) and enabling the sealing product (7) to solidify over the hole, forming a peelable sealing layer that can then be removed after the container is emptied, before the leak is ultimately repaired.

9 Claims, 2 Drawing Sheets

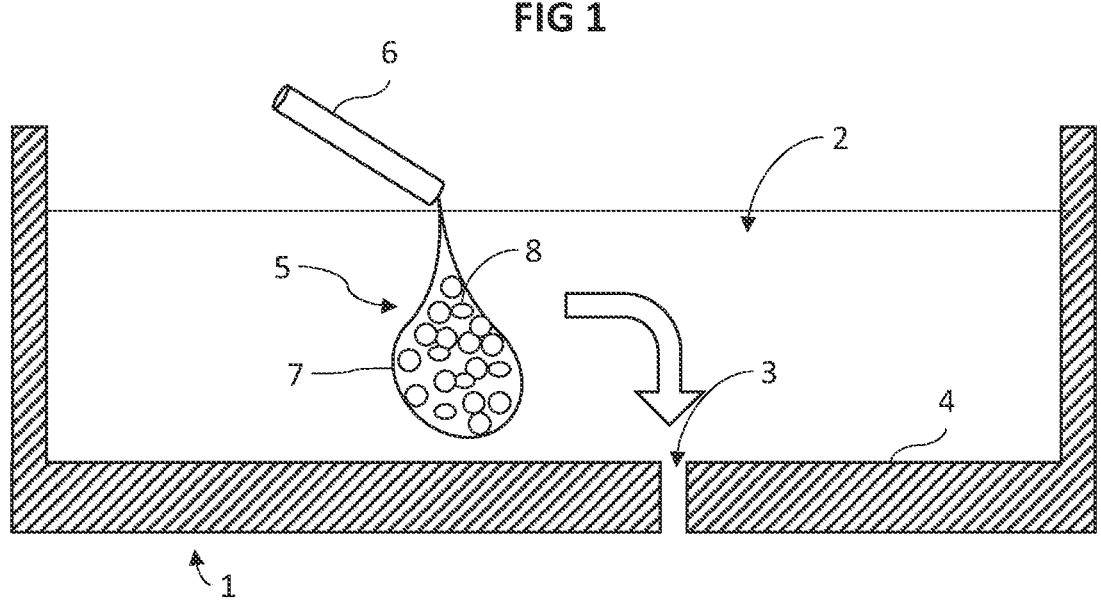
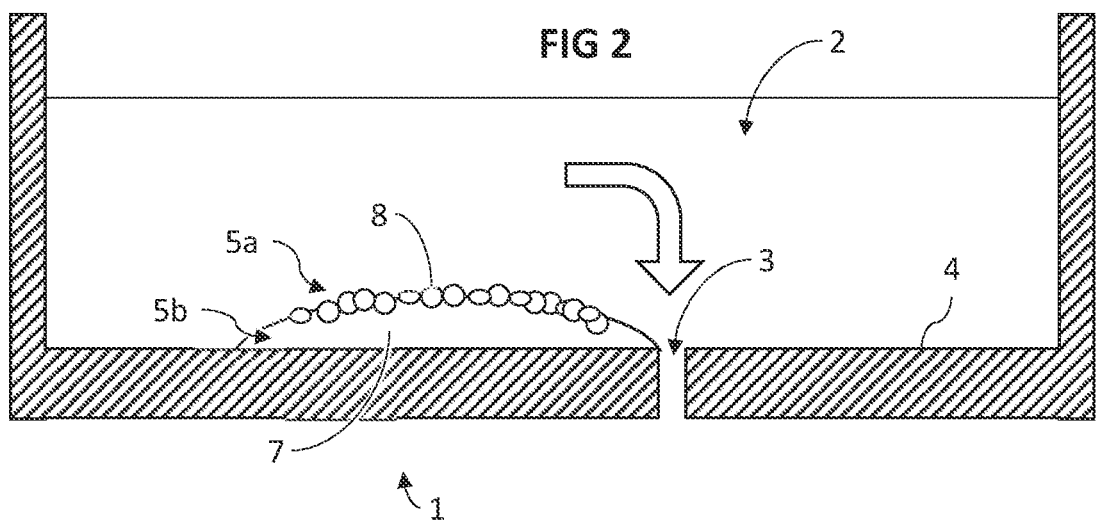

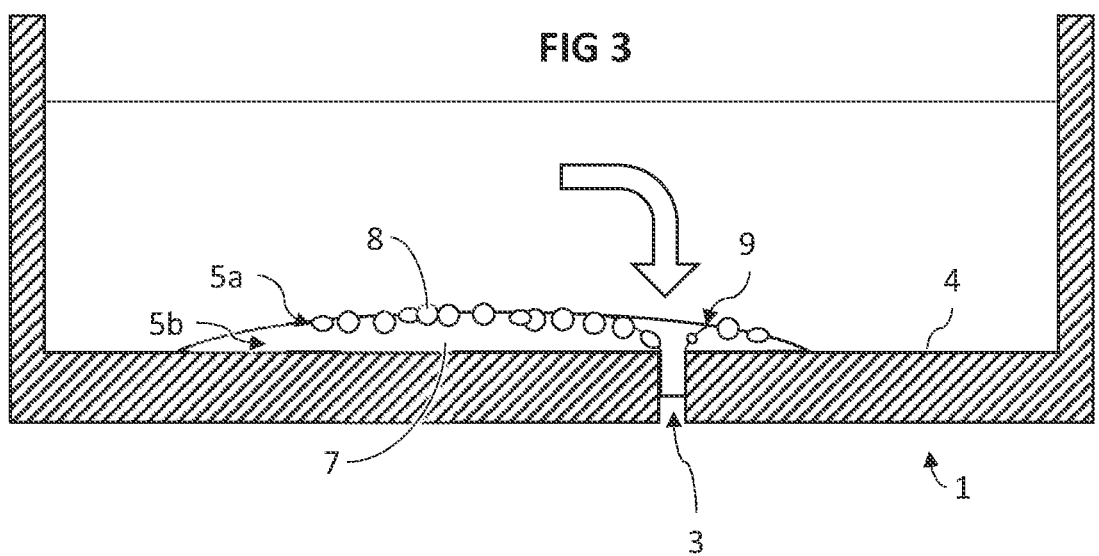
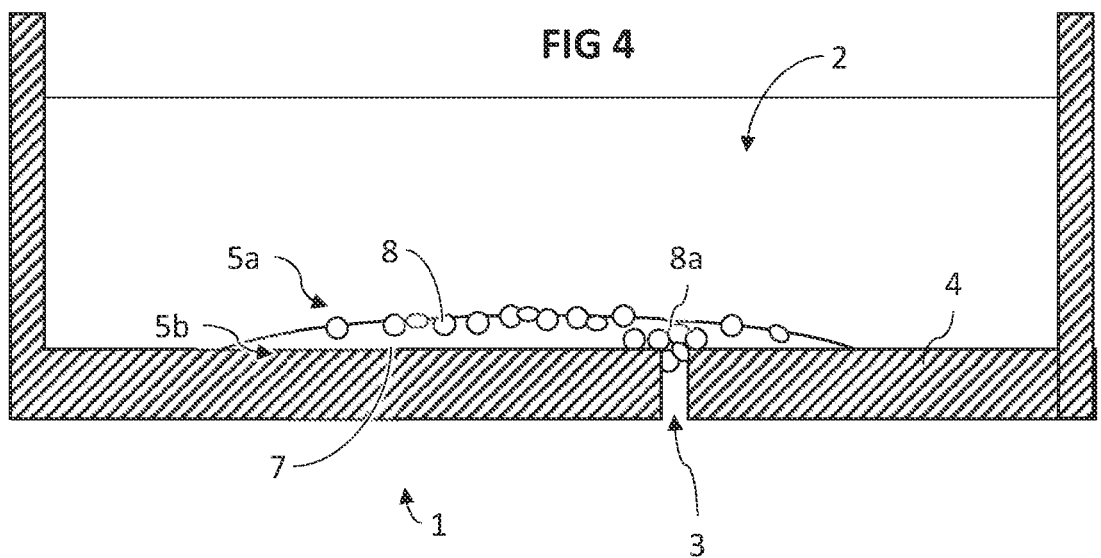
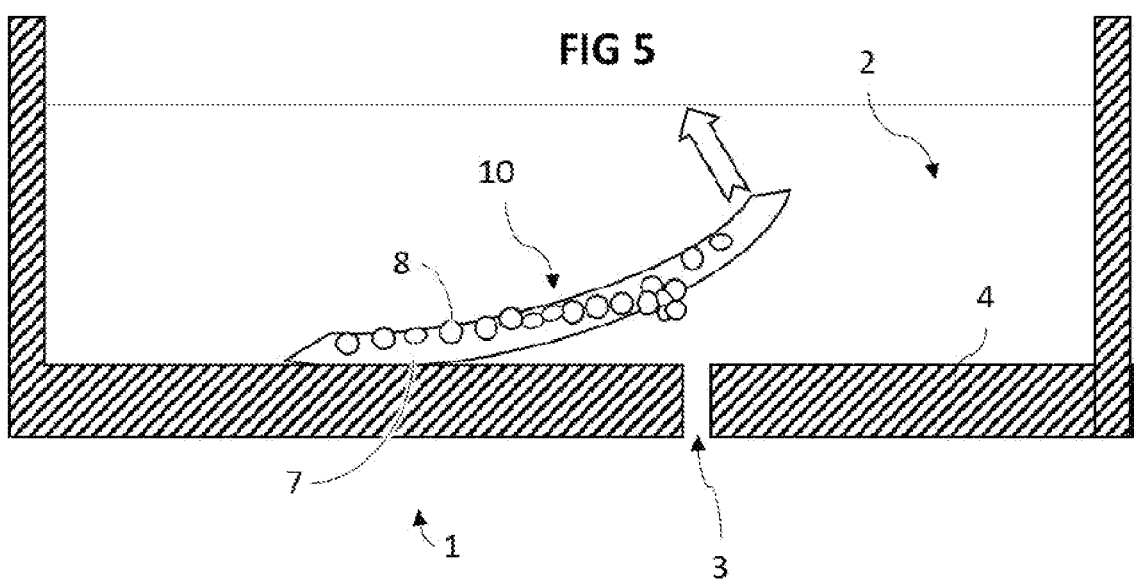

METHOD FOR REPAIRING A LEAK AT THE BOTTOM OF A CONTAINER COMPRISING A REVERSIBLE SEALING OF THE LEAK

CROSS-REFERENCE TO RELATED APPLICATIONS

The application is a National Phase Entry of International Patent Application No. PCT/FR2021/051693 filed on Sep. 30, 2021, which claims priority to French Patent Application No. FR2010089 filed on Oct. 2, 2020, both of which are incorporated by reference herein.

TECHNICAL FIELD

The present invention relates to the management of liquid contents stored in a container, and more specifically relates to a method for repairing a leak caused by an opening at the bottom of a container with liquid contents.

BACKGROUND

A wide variety of containers are used to store liquid contents. For example, vats, cisterns, reservoirs, basins or pools may contain water, liquid effluents or any other liquid contents. A container is defined by an enclosure impervious to the liquid contents, comprising at least one wall retaining said liquid contents. Each container has a bottom, defined by the direction of the earth's gravity acting on the liquid contents. The bottom may not be flat, and may not be perpendicular to the direction of earth's gravity. The bottom nevertheless corresponds to an area of the enclosure against which a fluid of density greater than that of the liquid contained in the container will be applied, possibly temporarily.

Like any device, such a container is subject to mechanical stresses and to aging that can lead to the appearance of openings such as holes or cracks. These openings break the imperviousness of the enclosure and may cause the liquid contents to leak out of the container. It is therefore necessary to repair the leak as quickly as possible, by plugging the opening causing the leak to restore the imperviousness of the enclosure of the container in order to prevent the loss of the liquid contents.

With previous methods, either the repair of the leak requires emptying the container as quickly as possible, exposing the opening to be plugged to the air, or the plugging is done by pouring a product (for example concrete or polyurethane) in large amounts so as to cover the bottom of the container In the first case, once the container has been emptied, an operator then goes to the place of the opening, and plugs the opening, typically by applying a plugging material to the opening, capable of ensuring an definitive and permanent restoration of the imperviousness of the container. The plugging of the opening can for example be a weld or a sealant. This is a time-consuming procedure, and any delay in repairing the leak increases the amount of liquid contents that escapes through said leak.

In the second case, the container is degraded, with in particular a substantially modified surface state of its bottom and a variation in the volume of the container. Although the leak has been stopped, it may be considered to remove the poured product which covers the bottom of the container in order to access the opening and to plug it properly. However, removing the poured product requires aggressive chemical or mechanical agents with a significant risk of altering the surface of the container. Indeed, the poured products alter the surface on which they are located, and adhere to this surface. For example, when concrete is poured, it is necessary to break it up, then scrape it out of the bottom. In all cases, the removal of the poured product results in degradation of the bottom of the container which may lead to the need for its replacement.

Moreover, the presence of the leak makes all these operations take on an urgent nature. However, the function of the container is precisely to store the liquid contents, and there may not be any immediately available alternative storage enabling the liquid contents to be evacuated from the container to be stored therein. Furthermore, the volume of liquid contents can be significant in the case of a large capacity container, and it is possible that emptying such a container will take a very long time.

It follows from these disadvantages that an opening, even of small size, can lead to a significant loss of the liquid contents or the pouring of a significant part of this liquid contents outside the container, for lack of a method for repairing the leak which allows to simply, quickly and effectively stop the flow of the liquid contents through the leak.

SUMMARY

The object of the invention is to overcome these disadvantages at least in part, by allowing to quickly and reversibly seal a leak through an opening at the bottom of a container filled with liquid contents by means of a sealing mixture, in a simple and effective way that does not require unavailability of the container, and does not require significant labor, prior to the definitive repair of the leak.

To this end, a method is proposed for repairing a leak caused by an opening at the bottom of a container with liquid contents, said liquid contents having a first density, the method comprising a reversible sealing of the leak comprising the steps according to which:

a sealing mixture is poured into the liquid contents in the vicinity of the opening, the sealing mixture comprising a sealing product and solid, rigid fillers mixed into said sealing product, the sealing product having a second density greater than the first density and having the capability to solidify within the liquid contents, the fillers having a third density lower than the second density, the sealing mixture spreads over the bottom of the container and reaches the opening, fillers of the sealing mixture congest the opening and enable the sealing product to solidify over the opening without being washed away by the leakage of the liquid contents through the opening, forming a peelable sealing layer on the bottom of the container impervious to the liquid contents, the repair method then comprising:

emptying the liquid contents from the container, removing the sealing layer carried out by peeling off said sealing layer, repairing the leak.

The proposed leak repair method therefore provides for a reversible sealing of the leak prior to the definitive repair of the leak, which allows to very quickly interrupt the flow of liquid contents out of the container, before the definitive repair of the leak, generally by plugging the opening.

The method is advantageously completed by the following characteristics, taken alone or in any of their technically possible combinations:

the sealing product has the capability to solidify without chemical or mechanical alteration of the material of the bottom of the container in contact with said sealing product;

the sealing layer is peeled off by applying traction to said layer;

fillers have a smallest dimension greater than 0.5 mm;

the third density is lower than the first density;

the fillers have various dimensions;

the fillers have a section with a greater dimension greater than one tenth of the width of the smallest rectangle which contains the opening, on the bottom of the container;

the sealing product is two-component, the method comprising a step of mixing the components to obtain said sealing product;

the solidification of the sealing product in the liquid contents occurs after at least 10 minutes and before 2 hours after pouring it into the liquid contents.

BRIEF DESCRIPTION OF THE DRAWINGS

The invention will be better understood, thanks to the description below, which relates to embodiments and variants according to the present invention, given by way of non-limiting examples and explained with reference to the appended schematic drawings, in which:

FIG. 1 is a schematic view showing the pouring of a sealing mixture into the liquid contents of a container with a leak, according to a possible embodiment of the invention;

FIG. 2 is a schematic view showing the sealing mixture spreading at the bottom of the container after pouring it illustrated by FIG. 1, according to a possible embodiment of the invention;

FIG. 3 is a schematic view showing the sealing mixture reaching the opening during its spreading, illustrated by FIG. 2, according to a possible embodiment of the invention;

FIG. 4 is a schematic view showing fillers of the sealing mixture congesting the opening and enabling the sealing product to solidify perpendicularly to the opening without being washed away by the leakage of the liquid contents through the opening, according to a possible embodiment of the invention; and FIG. 5 is a schematic view showing a removal of the sealing layer carried out by peeling off this sealing layer, according to a possible embodiment of the invention.

DETAILED DESCRIPTION

As indicated above, the proposed repair method adds a reversible sealing of the leak prior to the definitive repair of the leak by plugging the opening. With reference to the appended figures, an example of implementation of the reversible sealing of the leak is described here. A container 1 contains liquid contents 2. The leak of liquid contents 2 is caused by an opening 3 passing through a bottom 4 of the container 1. The leak results in a flow of the liquid contents 2 through the opening 3, and therefore by a leakage flow of liquid contents 2 in the container 1 in the direction of the opening 3 which is represented by an arrow in the figures. As indicated previously, the container 1 can be for example a tank, a cistern, a reservoir, a basin, or a pool, and the liquid contents 2 can be water, a liquid chemical product, liquid effluents or any other liquid product. The opening 3 can have different sizes and shapes, despite its schematic representation in the figures. The opening 3 can thus be a hole, a split, a crack, a tear, etc.

As illustrated in FIG. 1, a sealing mixture 5 is poured into the liquid contents 2 of the container 1 in the vicinity of the opening 3. Preferably, the sealing mixture is poured as close as possible to the opening 3, and ideally above the opening 3. However, it is not necessary for the sealing mixture 5 to be poured exactly above the opening 3, since the sealing mixture 5 then spreads over the bottom 4 of the container 1, and therefore covers an area that extends far beyond where it was poured. The vicinity of the opening 3 is therefore understood as an area sufficiently close to the opening 3 for the sealing mixture 5 to reach the opening 3 when the sealing mixture 5 spreads over the bottom 4 of the container 1, before the solidification of said sealing mixture 5 preventing this spreading. The extent of the vicinity of the opening where the sealing mixture 5 can initially be poured depends on several factors, such as the amount of sealing mixture 5 poured, the viscosity of the sealing mixture 5, the viscosity of the liquid contents 2, the size of the opening 3 which influences the leakage flow, a possible slope of the bottom 4 of the container 1, etc. Moreover, the pouring of sealing mixture 5 may not be punctual, but extend over a certain surface corresponding to an area of the bottom 4 of the container 1, thereby widening the extent of the vicinity of the opening 3.

It is therefore not necessary to know the location of the opening 3. It suffices to identify the area of the leak, for example by identifying from the outside the presence of a leak in a given area. It is even possible, when the bottom 4 of the container 1 is not too large with regard to the spreading capacities of the sealing mixture 5, to simply pour the sealing mixture 5 without having first identified the location of the leak, the sealing mixture 5 then covering the bottom 4 of the container 1.

As illustrated, the sealing mixture 5 can be poured out of the liquid contents, by direct pouring without tools or from a pouring tool 6 such as a cartridge dispenser gun, one or more tubes, etc. This approach has the advantage of being easier to implement, not requiring a submersible pouring tool 6, and with easier pouring because it takes place in the air rather than in the liquid contents 2, of higher density. It is however possible to pour the sealing mixture 5 inside the liquid contents 2, for example by immersing at least part of the pouring tool 6 which pours the sealing mixture 5. This approach can allow to approach as close as possible near the opening 3, in order to limit the amount of sealing mixture 5 poured, or more simply can be imposed by the configuration of the container 1 and the location of the opening 3.

The sealing mixture 5 comprises a sealing product 7 and solid fillers 8 mixed into said sealing product 7. The fillers 8 are solid, in that they retain their solid state in the sealing product 7 and in the liquid contents 2, being immiscible therein, and are rigid, in that they retain their shape in the sealing mixture 7 and the liquid contents 2. The fillers 8 are coated with sealing product 7. While the liquid contents 2 have a first density, the sealing product 7 having a second density greater than the first density.

The sealing product 7 has the capability to solidify within the liquid contents 2, that is to say without the need to be exposed to the open air. The sealing product 7 is capable of solidifying at ambient temperature (such as between 10 and 30° C., for example), without requiring heating. Furthermore, the sealing product 7 is chosen so as to be able to form a peelable layer on the bottom of the container 1 once said sealing product 7 has solidified. This layer is peelable in that it has the property of being able to be detached from the bottom surface of the container 1 on which it has solidified by applying traction to said layer, without needing to break said layer and without requiring any additional chemical product such as a solvent. Typically, this peelability comes from the ability of the sealing product 7 to solidify without chemical or mechanical alteration of the material of the bottom of the container 1 in contact with said sealing product 7. Intrinsically, the sealing product 7 does not adhere to the surface of the bottom of the container 1 on which it solidifies. This layer of solidified sealing product 7 is impervious to the liquid contents 2. Preferably, the solidified sealing product 7 has a flexibility capable of ensuring a pressing that is impervious to the liquid contents 2 of a layer of sealing product 7 on a flat surface.

The sealing product 7 preferably mainly comprises a polymer product, and is preferably a two-component, obtained by mixing two components of a resin. Such a mixture allows to cause the intrinsic polymerization of the sealing product 7, and therefore its solidification, even when immersed in the liquid contents 2. The sealing product 7 can in particular be a two-component silicone by addition, and can in particular be a room temperature vulcanization silicone or RTV silicone. Of course, other types of sealing product 7 can be used, provided that these sealing products 7 have the characteristics mentioned above. In addition to the density constraints, the choice of the sealing product 7 depends in particular on the nature of the liquid contents 2, since the sealing product 7 must be compatible with the liquid contents 2, and must in particular be able to solidify within said liquid contents. The choice of sealing product 7 also depends on the material at the bottom of a container 1 because it must form a peelable layer therein.

Depending on the sealing product 7, the solidification can be a polymerization, a vulcanization, a setting, or any other chemical reaction allowing to go from a sealing product capable of spreading at the bottom of the container 1 to a sealing product capable of sealing the opening 3. The time required for the sealing product 7 to solidify depends on the time considered necessary for the sealing mixture 5 to spread on the bottom 4 of the container 1 above the opening 3. The solidification must intervene late enough for the sealing mixture 5 to reach the opening 3 and enter the latter, but must not be unnecessarily long, at the risk of increasing the duration of the process without reason. Preferably, the solidification of the sealing product 7 occurs after at least 10 minutes, and preferably after at least 20 minutes after the pouring. Preferably, the solidification of the sealing product 7 occurs before 6 hours, and preferably before 4 hours after the pouring. Other durations can be considered.

The fillers 8 are solid particles of small size, the largest dimension of which is typically less than or equal to 20 mm. Although for the sake of simplicity and clarity the fillers 8 appear in the appended figures with a regular shape, and more particularly a shape of solid of revolution, such as a ball, or ovoid, such as an oval shape, the fillers 8 may have varied shapes, but preferably have non-smooth irregular shapes, for example with edges, and preferably complex shapes enabling said fillers 8 to fit into each other. The material of the fillers 8 is chosen to remain solid in the sealing mixture 5 and in the liquid contents 2, and to have a third density lower than the second density, or even lower than the first density. Preferably, the third density is less than 80% of the second density. According to a preferred example, the fillers are made of plastic, which combines the advantage of low density, rot-proofing, low cost, and the ease of controlling their shapes and dimensions. Other materials can however be considered, provided that they allow to obtain a low density and have suitable properties of mechanical strength and durability.

Following the pouring of the sealing mixture 5 into the liquid contents 2, the latter spreads over the bottom 4 of the container 1 above the opening 3. As illustrated in FIG. 2, the sealing mixture 5 may not immediately be above the opening 3, but may rather first spread close to said opening 3, depending on where the pouring took place. During its spreading, the sealing mixture 5 reaches the opening 3, and therefore spreads at the opening 3, as illustrated in FIG. 3.

The spreading of the sealing mixture 5 on the bottom 4 is in particular possible because the second density, that of the sealing product 7, is greater than the first density, that of the liquid contents 2. Although the fillers 8 have a third density lower than the second density, or even lower than the first density, the fillers 8 present in the sealing mixture 5 are coated with sealing product 7, and therefore remain in the sealing mixture 5 on the bottom 4. On the other hand, due to these differences in density, the fillers 8 gather on the upper part 5a of the cluster of sealing mixture 5, and even rather on the surface of this cluster, the lower part 5b of the cluster of sealing mixture 5 essentially containing the sealing product 7.

It should be noted that the spreading of the sealing mixture 5 takes place preferentially in the direction of the opening 3. Due to the leak, there is a leakage flow of liquid contents 2 in the direction of the opening 3, which similarly leads the sealing mixture 5 in the direction of the opening 3. The very presence of the leak causes the sealing mixture 5 to arrive at the opening 3.

The leak results in a leak cone 9 of the liquid contents which prevents the sealing product 7 from stabilizing on the opening 3 to solidify and thus clog the leak. On the other hand, the fillers 8, which float on the sealing product 7 in the upper part 5a of the cluster of sealing mixture 5, are driven by the leak cone 9 into the opening 3. If the third density was too high, for example greater than or equal to the second density, the fillers 8 would not be washed away by the leakage. It is for this reason that the third density is lower than the second density, and preferably is lower than the first density.

Since the fillers 8 are solid and have a non-negligible section compared to the size of the opening 3, these fillers 8 cooperate with each other and with the walls of the opening 3, and end up filling the opening 3, that is to say forming a blockage 8a of the section of this opening 3, as in the example of FIG. 4. In this example, the congestion by the fillers 8 appears at the entrance to the opening 3. This congestion 8a could however appear deeper in the opening 3, in particular depending on the geometry of the opening 3, and in particular on its section, in a flow direction of the leak, or on the size and shape of the fillers 8.

The good congestion of the opening 3 by the fillers 8 is first ensured by their solid and rigid character suitable for ensuring sufficient mechanical strength to fill the opening 3. The congestion is also ensured by the irregular shape of the fillers 8. The congestion of the opening 3 is also ensured by a sufficient size of at least some of the fillers 8, said fillers preferably having a smallest dimension (typically perpendicular to their largest dimension) greater than 0.5 mm, and preferably greater than 1 mm. For example, fillers 8 have a section with a larger dimension comprised between 0.5 mm and 20 mm. Some fillers 8 must be all the larger as their shape is smooth. In particular, for the case of fillers 8 having the shape of a solid of revolution, it is preferable that at least some of the fillers 8 have a section with a largest dimension (for example a diameter) greater than one tenth (preferably greater than one quarter or half) of the width of the smallest rectangle that contains the opening (on the bottom of a container, at the mouth of the opening in the interior space of the container 1). Insofar as the largest dimension of the section of the opening 3 is generally not known with precision, the presence of fillers 8 with various dimensions enables the sealing mixture 5 to be adapted to seal leaks caused by openings 3 of different sizes.

The congestion of the opening 3 by the fillers 8 allows to drastically limit the leakage flow through the opening 3, without however clogging the leak and therefore completely interrupting this leakage flow. The leakage flow is however sufficiently limited by the filling for the sealing product 7 to be able to rest on the opening 3 long enough to solidify. In fact, the sealing product 7 compensates for any residual leakage after the congestion of the opening 3 by the fillers 8, especially when the viscosity of the sealing product 7 is high. The congestion by the fillers 8 then allows the sealing product 7 to solidify perpendicularly to the opening 3 without being washed away by the leakage of the liquid contents 2 through the opening 3. After solidification, the leak is then reversibly sealed by a sealing layer 10 consisting of the sealing mixture 5 comprising fillers 8 taken in a solidified sealing product 7.

In view of the foregoing, it appears that the characteristics that the sealing product 7 and the fillers 8 must have are those which allow to implement the method satisfactorily, being reminded of the constraints that the sealing product must meet in terms of density, the capability to solidify in the liquid contents 2, and the property of forming a peelable layer on the bottom 4 of the container 1.

By the presence of the solidified sealing product 7, the sealing layer 10 forms a peelable layer on the bottom 4 of the container 1. This sealing layer 10 is impervious to the liquid contents 2. In addition to the greater density of the sealing product 7 compared to that of the liquid contents 2, the sealing layer 10 is held in place by a suction cup effect which presses the sealing layer 10 against the bottom 4 of the container 1. The holding in place of the sealing layer 10 is not related to any mechanical or chemical alteration of the surface of the bottom 4 of the container 1 which would ensure adhesion between the sealing layer 10 and the bottom 4 of the container 1.

Once the leak has been sealed reversibly by the sealing layer formed from the sealing mixture 5 comprising fillers 8 taken up in a solidified sealing product 7, the loss of liquid contents is stopped.

It is then possible to proceed with the repair of the container 1 without the urgency presented by the need to stop the flow of liquid contents 2 through the leak. It is then possible to implement the rest of the repair process later, for example several days later, when the conditions favorable to the definitive, that is to say irreversible and permanent, repair of the leak have been met. It is then possible to empty the container 1 from its liquid contents in a programmed manner, in order to set up an definitive repair solution for said container 1. The emptying of the liquid contents 2 from the container 1 allows to update the sealing layer 10 to remove it, and prevents a new flow of the liquid contents 2 through the leak.

The sealing layer 10 is then removed by peeling said sealing layer 10. As the sealing layer 10 is peelable, it can be removed without the use of any chemical products, and without the need to break this sealing layer 10. Insofar as the sealing layer 10 does not adhere to the bottom 4 of the container 1 by chemical or mechanical cooperation, it is sufficient to exert traction, preferably at least partially upwards, on said sealing layer 10 to remove it. No further action is required. As illustrated in FIG. 5 by an arrow, it is possible to grasp the sealing layer 10 by one edge, and lift it to peel it off. It is then possible to remove the sealing layer 10 without breaking it.

Once the sealing layer 10 which ensured the reversible sealing has been removed, the opening 3 is no longer sealed, and is accessible to be plugged in order to repair the leak. The leak can be repaired by conventional solutions, which depend on the nature of the container 1, in order to regain satisfactory imperviousness. Generally, the repair of the leak comprises a plugging of the opening 3, capable of ensuring an definitive and lasting restoration of the imperviousness of the container 1. The plugging of the opening 3 can for example be a welding or the application of a sealant. In order to ensure this definitive and lasting restoration of the imperviousness, the plugging of the opening 3 may this time involve a chemical or mechanical alteration of the enclosure of the container capable of ensuring the structural continuity between the plugging material and the container 1.

The invention is not limited to the embodiment described and shown in the appended figures. Modifications remain possible, in particular from the point of view of the constitution of the various technical characteristics or by substitution of technical equivalents, without thereby departing from the scope of protection of the invention.

The invention claimed is:

1. A method for repairing a leak caused by an opening at the bottom of a container with liquid contents, said liquid contents having a first density, the method comprising a reversible sealing of the leak comprising the steps according to which:
   a sealing mixture is poured into the liquid contents in the vicinity of the opening, the sealing mixture comprising a sealing product and solid, rigid fillers mixed into said sealing product, the sealing product having a second density greater than the first density and having the capability to solidify within the liquid contents, the fillers having a third density lower than the second density,
   the sealing mixture spreads over the bottom of the container and reaches the opening,
   fillers of the sealing mixture congests the opening and enable the sealing product to solidify over the opening without being washed away by the leakage of the liquid contents through the opening, forming a peelable sealing layer on the bottom of the container impervious to the liquid contents,
the repair method then comprising:
   emptying the liquid contents from the container,
   removing the sealing layer by peeling off said sealing layer,
   repairing the leak.

2. The method according to claim 1, wherein the sealing product has the capability to solidify without chemical or mechanical alteration of the material of the bottom of the container in contact with said sealing product.

3. The method of claim 1, wherein the sealing layer is peeled off by exerting traction on said sealing layer.

4. The method of claim 1, wherein the fillers have a smallest dimension greater than 0.5 mm.

5. The method of claim 1, wherein the third density is lower than the first density.

6. The method of claim 1, wherein the fillers have various dimensions.

7. The method of claim 1, wherein the fillers have a section with a largest dimension greater than one tenth of the width of a smallest rectangle which contains the opening, on the bottom of the container.

8. The method of claim 1, wherein the sealing product is two-component, the method comprising a step of mixing the components to obtain said sealing product.

9. The method of claim 1, wherein the solidification of the sealing product in the liquid contents occurs after at least 10 minutes and before 2 hours after pouring the sealing mixture into the liquid contents.

\* \* \* \* \*